2,151,301

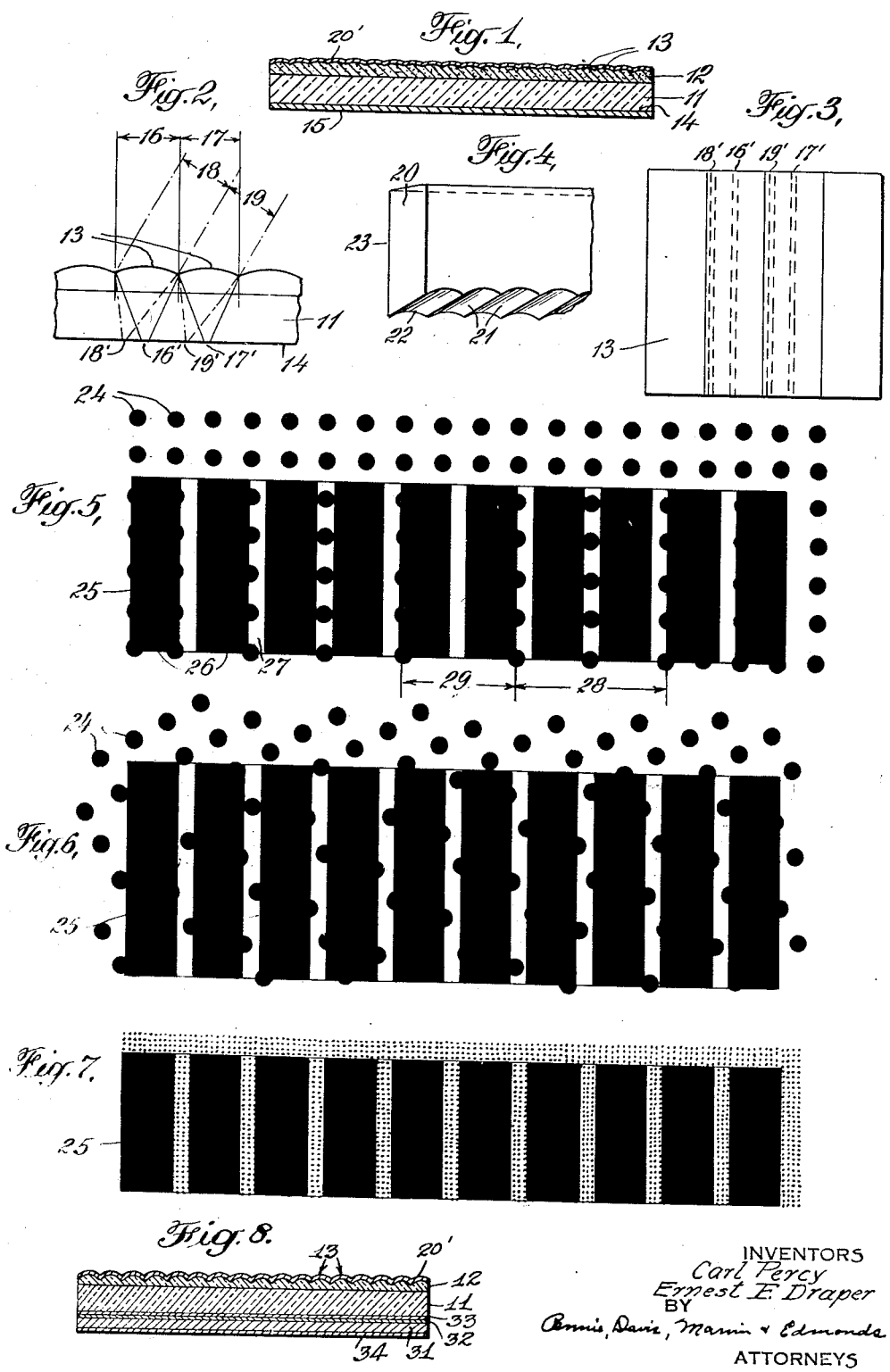
March 21, 1939. C. PERCY ET AL 2,151,301
STEREOSCOPIC PHOTOGRAPHY
Filed March 17, 1936
INVENTORS
Carl Percy
Ernest E. Draper
ATTORNEYS Patented Mar. 21, 1939

UNITED STATES PATENT OFFICE 2,151,301

STEREOSCOPIC PHOTOGRAPHY

Carl Percy, New York, and Ernest E. Draper, Scarsdale, N. Y., assignors to The Perser Corporation, New York, N. Y., a corporation of New York Application March 17, 1936, Serial No. 69,308

11 Claims. (Cl. 88—1)

This invention relates to arrangements which exhibit pictures in stereoscopic relief, especially to arrangements of the class which employ images of the "depthograph" or "parallax panoramagram" type in conjunction with suitable viewing means. In its more particular aspects the invention is directed to improvements in picture assemblies which may be viewed by reflected light, and to the provision of picture assemblies of this type which can be economically produced in large quantities.

A "depthograph" or "parallax panoramagram" image may be described broadly as a composite image containing interlineated views of an object field as seen from a plurality of points of view. More specifically, a depthograph or parallax panoramagram image is a composite image composed of a plurality of lineated panels, different panels representing different portions of the object field on which the camera is focused, and a single panel containing a lineated image of a single portion of said object field as seen from a plurality of points of view. In general, a portion of the object field lying in the principal plane on which the camera is focused will be recorded in only one panel of the parallax panoramagram, while portions lying in planes far removed from the principal plane will be recorded in more than one panel.

Images of this general character may be produced by apparatus such, for example, as are described in U. S. Patents Nos. 1,260,682 and 1,882,648. The apparatus described in the latter patent has important advantages over that of the former since it need not be moved with respect to the object field during exposure and requires a much shorter time of exposure. When viewed in conjunction with a suitable lineating screen, or parallax panoramagram lineator, such as the type having alternate transparent and opaque parallel lines, or the type formed of parallel cylindrical lens elements, such an image presents a different lineated picture to each eye of the observer, and if the lineated pictures are stereoscopically related the observer will see the recorded object field exhibited in stereoscopic relief. Although both types of lineating screens are suitable for viewing pictures by transmitted light, the alternate transparent and opaque lined screen is not practicable for viewing pictures by reflected light.

An analogous type of image is produced in accordance with U. S. Patent No. 1,935,471. The images of this patent, however, show changing aspects of an object both horizontally and vertically, and may be termed "diclinic" to distinguish them from images of the type shown in the patents previously mentioned, which show changing aspects of an object in one direction only, usually horizontally, and therefore may be termed "monoclinic". The viewing lineating screens will be similar for both monoclinic and diclinic pictures, but in the latter case spherical lenticulations and round holes will be used instead of the corresponding cylindrical lenticulations and long slits for the monoclinic pictures. Certain types of lineators are suitable for use with both diclinic pictures and monoclinic pictures. Although the hereinafter discussion will more directly concern pictures of the monoclinic type, since these are of much greater practical importance, it will be apparent that the various features of the invention are also applicable to pictures of the diclinic type.

It has heretofore been proposed to produce stereoscopic picture assemblies of the reflecting type by taking a single sheet of glass, Celluloid, etc., and forming parallel cylindrical lenses on one surface thereof to produce a lineating element. An image of the parallax panoramagram type is then either photographically printed directly on the rear surface of the lineating element with the lineated panels in registry with the lenses, or the image is photographically printed on a separate support and then attached to the lineating screen in proper registry with the lenses and at the plane of their foci.

In order to present a picture of sufficient clearness and continuity a comparatively large number of panels and corresponding lens elements are required. While this number may vary within wide limits, depending on the quality of detail desired, about 400 panels have been found in practice to give very good results. For a picture 10 inches in width this would require a lineating screen having 40 transparent lines, or 40 lens elements per inch.

At the present time it has not proven feasible to form integral cylindrical lenses directly on a glass plate with sufficient accuracy with this order of fineness. On the other hand, when Celluloid or other similar material is employed it is possible to form suitable lens-like ribs of this order of fineness but the Celluloid has a tendency to warp or change its size with variations in climatic conditions, age, etc. This renders difficult the proper registry of the lineated image panels with the ribs. Furthermore, the matter of registration introduces complications in the production of the picture assemblies which are undesirable when large quantities are produced.

It has therefore been suggested to employ a composite lineating element comprising a sheet of glass and a sheet of Celluloid or other transparent organic material more readily formable than glass securely affixed thereto, the cylindrical ribs being formed in the latter material. In this manner the ribs can be conveniently and accurately formed in the more plastic material, and the supporting plate of glass prevents subsequent distortion of the lineating element.

The present invention is in part an improvement on this last mentioned suggestion, and provides a lineating element which can be readily and economically produced with ribs of the requisite accuracy. In accordance with the invention, a glass plate is coated with a layer of clear transparent gelatine, and the ribs are formed in the gelatine by cutting, molding, or other suitable method. In a present preferred procedure, the ribs are cut in the gelatine by a cutting tool which operates in the manner of a comb and shaves the gelatine surface to form the ribs therein.

When this forming is completed the ribs usually have a somewhat mat surface which diffuses in all directions light impinging thereon. This mat surface is highly undesirable because it permits an observer to see not only the single desired narrow element of a panel of the parallax panoramagram through a given rib from a single point of view, but also other portions of the same panel through the same rib. This impairs the clarity, sharpness and depth of the observed picture. Also, the mat surface renders the ribs themselves undesirably conspicuous and cuts down the intensity of illumination of the parallax panoramagram. For these reasons some means of removing this mat diffusing surface is desirable, and the means employed should be such as will not seriously impair the lens-like formation of the gelatine ribs.

It has been found that this mat surface can be successfully removed without deforming the ribs or seriously impairing their optical properties by giving the ribbed surface a thin transparent coating of a suitable varnish. The application of the varnish is carefully controlled so as to fill in the minute pits or irregularities of the mat surface of the ribs without adversely affecting the lens-like formation thereof to a substantial degree, and to leave the surface of the varnish coating itself smooth and regular. Thus the coating of varnish removes the mat surface of the gelatine and provides an optically smooth refracting surface for the gelatine ribs without substantially impairing the lens-like formation thereof.

The application of the varnish also renders the ribbed surface less likely to be damaged by handling, and more immune to climatic conditions. Furthermore, it enables the ribbed surface to be cleaned without danger of impairing the optical properties of the ribs.

In one method of producing picture assemblies of this general type the composite image is photographically printed onto a plate of glass and this plate is attached to another plate of glass on which a suitable lined screen has been formed. This type of construction is found to be satisfactory in many respects, especially since these pictures are intended to be viewed by transmitted light. However, in the production of picture assemblies to be viewed by reflected light, for which the above described gelatine lineating screen is particularly adapted, it has been found possible to make the production of large quantities much simpler and more economical by employing prints made by a suitable photo-mechanical printing process, these prints being preferably on paper.

In attempting to employ a photo-mechanically printed picture of the parallax panoramagram type it is found that due to the peculiar nature of these pictures, and the method of viewing the same, certain difficulties arise which are not present in ordinary commercial photography. These difficulties arise from the fact that parallax panoramagram images are viewed in conjunction with a lineating screen which has a large number of closely spaced lineations over the width of the picture, each lineation presenting to a single point of view only a narrow portion of a single panel of the parallax panoramagram. Because of this method of viewing two principal problems arise in connection with the use of photo-mechanical prints, namely, the securing of sufficiently fine detail in the print to present a picture of adequate clarity to an observer, and the avoidance of distractive moiré patterning.

These two factors render the use of parallax panoramagrams produced in the manner of many commercially printed pictures quite unsatisfactory. Thus when the picture employed is of the ordinary half-tone type, in which the image is formed by a myriad of tiny dots of ink of varying size, it is found that dots of ink which are ordinarily inconspicuous in a good quality half-tone picture may coact with the lineating screen to produce a series of alternate dark and light bands across the face of the observed picture which are quite distracting. This general effect is known as moiré patterning.

The moiré patterning produced by the coaction of the lineations of the screen with the component elements of the half-tone should not be confused with the moiré patterning due to the lineations of the screen being at an angle with respect to the panels of the parallax panoramagram, or, in some cases, due to the screen not being at the proper distance from the parallax panoramagram. Moiré patterning due to those last two sources may occur even with photographically printed parallax panoramagrams.

It was also found that the definition of the observed stereoscopic picture when using such a half-tone was rather poor. This is due to the fact that since only a fraction of the total area of the parallax panoramagram is seen from any single point of view, and different views of the parallax panoramagram must be visible from different viewpoints in order to present stereoscopic views to a number of observers, a much greater amount of detail must be recorded in a parallax panoramagram than in an ordinary photograph. Looking at the problem slightly differently, since a parallax panoramagram contains a large number of views of an object field as seen from different points of view, all of which are recorded in the same area as an ordinary photograph which appears of the same size to an observer, and since each view must contain sufficient detail to present a clear picture to an observer, much more detail must be recorded in the parallax panoramagram than in an ordinary photograph. This is particularly emphasized by the fact that it is the difference in appearance of the views of the parallax panoramagram seen by the two eyes of any observer, or, stated differently, the difference between the lineated elements of a single panel of the parallax panoramagram seen by the two eyes of the observer, which creates the effect of depth in the picture.

Thus to present a stereoscopic picture of desirable quality to an observer the photo-mechanically printed image should be of a type which will record sufficient detail as pointed out above, and the component inked elements of the print forming the outlines and contrasts of the picture should be of such character as not to form a distractive moiré pattern with the lineations of the screen.

To secure these desired qualities the photo-mechanically printed picture employed is preferably of the type which contains substantially no discrete elements or pattern, as, for example, one produced by the photo-gelatine or collotype process. Pictures printed by this process have a substantially continuous tone and present pictures of good clarity without the formation of moiré. Other types of process printing can be employed with varying degrees of success provided the picture is either of the substantially patternless, continuous tone type or the grains or elements which form the outlines and contrasts of the picture are sufficiently fine or so oriented that they themselves will not coact with the lineating screen to form moiré, as further discussed hereinafter.

When a print produced by the collotype process is positioned at the rear surface of a lineating screen such as has been described hereinbefore, it is found that the picture presented to an observer is somewhat dull and lacking in contrast between the blacks and whites. Also the picture is somewhat lacking in brilliancy. It has been found that contrasts may be brought out, and brilliancy much enhanced, by applying a fairly heavy coat of a suitable clear transparent varnish over the surface of the collotype before affixing it to the lineating element. When this is done a very satisfactory picture is produced. If the varnish is applied to both sides of the print it will render the picture less likely to be distorted or shrunk by changes in climatic conditions, thereby insuring the maintenance of proper registry between the panels of the picture and the lineations of the screen, a consideration which is very important.

With depthograph pictures to be viewed by transmitted light, it is highly desirable that the pictures be colored to render them more striking, attractive and realistic. Such coloring may advantageously be applied by hand. When, however, it is attempted to apply colors to a collotype picture by hand it is found that the rubbing which necessarily accompanies hand coloring smudges the ink on the collotype to some extent and results in a smudged rendering of the picture. It will be understood from the foregoing discussion that due to the fineness of detail which a parallax panoramagram must contain, an amount of smudging which would be quite inappreciable with an ordinary picture may seriously impair the clarity and depth of the observed stereoscopic picture.

It has been found that by applying a light coating of a suitable clear transparent varnish to the black and white collotype before proceeding with the hand coloring this difficulty can be substantially eliminated. The amount of varnish applied should preferably be regulated so as to just adequately protect the ink of the picture from being smudged, but not to sufficiently gloss over and destroy the tooth of the paper to render it difficult or impossible to artfully apply the colors.

It is also possible to obtain desired coloring by a color printing process, such as the collotype process. In this case it is preferable to coat the colored collotype with a fairly heavy coating of lacquer in order to improve the contrast in the picture and to render it more brilliant, as in the case of a black and white collotype.

A better understanding of the various features of the invention may be obtained from the following detailed description, taken in conjunction with the accompanying drawing. For the sake of clearness the size of the ribs, the thickness of the lineating screen, the size and spacing of the half-tone dots, etc., have been enormously exaggerated, and no attempt has been made to preserve correct proportions.

In the drawing:

Fig. 1 is a cross-sectional view of a preferred form of stereoscopic picture according to the present invention;

Fig. 2 illustrates the manner in which the parallel cylindrical lens elements function as a lineating screen;

Fig. 3 is a plan view of the screen of Fig. 2;

Fig. 4 is a perspective view of a cutting tool suitable for forming the ribs in the gelatine layer;

Fig. 5 is a diagram illustrating the formation of moiré patterns when using ordinary half-tone prints;

Fig. 6 illustrates one method of avoiding the formation of distractive moiré patterns when using the half-tone spacing of Fig. 5; and Fig. 7 illustrates a method of avoiding distractive moiré patterning by the use of very fine half-tone screens.

Fig. 8 is a cross-sectional view similar to Fig. 1, illustrating certain modifications thereof.

Referring to Figure 1, a support plate 11 of a clear transparent material, preferably glass, is provided with a coating 12 of gelatine of suitable hardness. Plate 11 may be of materials other than glass, if desired, for example, Celluloid or the cellulose acetate plastic known by the trade name of "Lumarith". In such cases, however, difficulties due to shrinkage, lack of registration, etc., arise so that glass is preferred. The gelatine coating may be applied to the plate 11 in any suitable manner and is preferably adhesively secured to the glass plate throughout the area of contact. It will be understood that this adhesion need not necessarily be secured by the use of a separate adhesive material, since gelatine itself is readily adherent to glass when applied in the manner ordinarily employed in photography. In the exposed front surface of the layer of gelatine are formed ribs 13 by a suitable process such as cutting or molding. These ribs form parallel convex cylindrical lens elements or lenticulations, each having a focus approximately at the rear surface 14 of the plate 11. An image 15 of the parallax panoramagram type is then positioned at or secured to the rear surface 14, with the panels of the parallax panoramagram in registry with the ribs.

The ribbed element of Fig. 1 functions as a lineating screen as shown in Fig. 2. If parallel beams of light, such as 16 and 17, fall perpendicularly onto the ribbed surface, they are converged by the corresponding ribs or lenticulations 13 to narrow strips 16' and 17' on the rear surface 14 of plate 11. These strips are shown by dotted lines in the vertical plan view of Fig. 3. Similarly, since the paths of the light rays are reversible, rays emanating from strip elements 16' and 17' and striking the same ribs 13 emerge in the form of parallel beams of light 16 and 17. Thus, an observer directly in front of the lineating screen would see areas 16' and 17'. An observer standing at an angle to the lineating screen, however, would see a different lineated area of the rear surface 14 of plate 11, which would lie to the right or left of areas 16', 17', as the case might be. This is illustrated by the oblique beams of light 18 and 19, converging on or emanating from elements 18' and 19'. For the proper viewing of the stereoscopic picture it is essential that each eye of the observer sees a different lineated area of the picture 15 at the rear surface of plate 11, and series of lenses 13 provides for this.

It is not necessary that the parallax panoramagram 15 be contiguous to the rear surface 14 of the support plate 11, provided that the curvature of the ribs 13 be appropriately altered. The parallax panoramagram may be spaced away from the rear of the support plate, or the lineating screen as a whole may be reversed and the parallax panoramagram placed on the ribbed side of the screen at a suitable distance therefrom. In general the curvature of the ribs should be such that the plane of the foci of the ribs, that is, the foci plane, coincides substantially with the plane of the parallax panoramagram. Furthermore, the screen might be used in conjunction with a projected parallax panoramagram image, the position of which would be governed by the foci plane of the lenses.

From Fig. 2 it is apparent that the more accurately the ribs are focused on the surface of the parallax panoramagram associated therewith, the narrower will be the portion of a single panel of the parallax panoramagram observed through the corresponding rib. Since the panel contains a record of a given portion of the object field as seen from a number of different points of view (preferably an infinite number of points of view) the narrower the observed portion of the panel is, the closer that observed portion will correspond to a single point of view. Thus the clarity and depth of the picture is improved by accurate formation of the lens-like ribs. The employment of gelatine facilitates the proper formation of the ribs since it is comparatively easy to form this material in the desired manner, as compared with other less workable substances.

The present preferred manner of forming the ribs in the gelatine is by coating a glass plate with the gelatine and cutting the ribs in the gelatine layer, after it has dried and solidified, by means of a suitable cutting tool, such as is illustrated in Fig. 4. This cutting tool is a plate 20 of suitable material, such as tool steel, having a series of concave cylindrical grooves 21 at the bottom edge thereof. The front edge 22 of grooves 21 is the cutting edge, and the axes of the grooves are at an acute angle with respect to the front face 23 of the cutting tool so as to provide a suitable bottom clearance to the tool when cutting the gelatine. This tool is placed in a suitable machine, for example, a planer, and shaves the surface of the gelatine down to give the required configuration for the ribs.

Such a procedure forms ribs of the desired accuracy in a simple and expeditious manner and, since the material is in its solid, permanent state and firmly attached to the glass when the ribs are formed therein, the ribs are not likely to be deformed by subsequent shrinkage, etc. Care should be taken, of course, to cut the ribs as smoothly and regularly as possible.

With this procedure it is found that despite great care used in cutting the elements, the surfaces of the ribs are usually left slightly mat. Due to this mat surface one eye of an observer will not see only a single narrow strip behind each rib, but will also see to a lesser extent other portions of the lineated panel behind that rib. Thus the picture presented to one eye of an observer will not be a sharply defined picture of the object field as seen from a single point of view, but will be clouded by the presence of somewhat fainter images of other points of view. Furthermore, the slightly mat surface of the ribs reflects light to an observer from the surface of the ribs and renders the ribs themselves undesirably conspicuous.

For these reasons a polishing operation is ordinarily necessary to smooth off the surfaces of the ribs, and it is necessary that this polishing step be performed without destroying or impairing the optical image-forming properties of the ribs to an appreciable degree. It has been found that by applying a thin coating 20' (Fig. 1) of a clear transparent lacquer to the surface of the ribs after the forming operation a smooth glossy finish is produced, having good optical properties, and by avoiding the application of too thick a coating the optical perfection of the ribs will not be substantially impaired in other respects. The preferred procedure in applying the lacquer is to apply it in a fine spray in a direction parallel to or at a small angle to the direction of the ribs, and permitting it to dry. The lacquer, being in liquid form, enters and fills up the minute pits or irregularities of the mat surface, and forms a closely adhering coating having a smooth optical surface thereover. By avoiding the application of too thick a coating the formation of the ribs is not seriously affected, even when they are of the fineness required for small still pictures.

In addition to providing a smooth optical surface for the ribs, this treatment also renders the surface of the ribs more durable so that handling will not mar the lenses, and also serves to preserve and protect the gelatine from the effects of heat and moisture such as produced by adverse or changing climatic conditions. Furthermore, it enables the ribbed surface to be much more easily cleaned, and without danger of deforming the ribs. For these reasons a coating of lacquer is desirable even though the surface of the gelatine ribs may be sufficiently smooth so as not to require a coating for the purpose of rendering it optically perfect.

Lacquers of the cellulose type have been found to give good results, but suitable varnishes other than these cellulose lacquers may be employed if desired. Certain considerations should be kept in mind in selecting the proper varnish, namely, firm adherence to the gelatine, transparency, permanency, ability to protect the coated surface from climatic conditions, durability of coating, clarity, quickness of drying, etc. These, among other considerations, will determine the choice of the proper varnish to fit the circumstances. Cellulose lacquers, in general, are quicker drying than varnishes of other types, particularly oil varnishes, and thus facilitate the manufacture of the lineating screens. Preferably the varnish should be clear and colorless, although in some cases color may be permissible or even desirable.

Treatments other than the application of lacquer or other varnish can be employed with more or less success, to smoothen the mat surface of the ribs. Thus a light coating of oil, such as castor oil, has been found beneficial. The oil being in liquid condition, enters the pits of the mat surface and forms a closely adhering film thereover. If desired, the gelatine may be given a hardening treatment by the use of suitable hardeners such as alum or formaldehyde, to leave the gelatine in a more durable condition.

In the preferred embodiment of the invention, wherein it is desired to produce a number of reproductions of a given picture assembly as economically as possible, the picture 15 will be a photo-mechanically printed paper reproduction of a parallax panoramagram. In small quantities, however, it may be desirable to use ordinary photographically printed pictures which may be printed either on paper or on glass, as desired. It is also possible to photographically print the picture directly on the back of plate 11, being careful to properly register the panels of the parallax panoramagram with the ribs of the lineating screen.

When using a photo-mechanically reproduced print difficulties arise, as pointed out hereinbefore, from the production of distractive moiré patterns due to the peculiarities of the means by which these stereoscopic pictures are viewed. If the print is made by the dotted half-tone process, which is the one most widely used, it is found that the inked dots which go to make up the half-tone usually coact with the lineating screen to form moiré patterns. A simple case of moiré patterning is illustrated in Fig. 5. Here the rows of dots 24 printed on a suitable support (not shown) represent a portion of a half-tone reproduction. The lineating screen 25 consists of alternate opaque spaces 26 and transparent spaces 27, and is placed over the half-tone. The ribbed lineating screen of Figs. 1 and 2, while not the same in all respects as the lineating screen 25, functions in a similar manner as regards moiré patterning so that the discussion of Figs. 5, 6 and 7 will also apply to the ribbed screen.

From Fig. 5 it will be seen that the dots of the half-tone coact with the clear spaces of the lineating screen to form a series of alternate dark areas 28 and light areas 29 across the width of the picture. The width of these areas 28 and 29 is several times the separation of the lineations, and therefore the areas may be quite conspicuous. The width and number of these alternate dark and light areas will vary with changes in the relative spacing between the dots of the half-tone and the clear spaces of the lineating screen, as will be apparent from Fig. 5. The extent to which the areas are noticeable will also depend upon the general tone of the recorded picture, that is, upon the lights and shades of the picture. For example, in very dark portions of the picture the inked dots are so large and so close together that any moiré may be quite negligible. Also, in very light portions the dots may be so fine as to render moiré inconspicuous. For shades in between these, however, very noticeable and distractive moiré patterns may occur. The presence of these moiré bands is detrimental to the quality and naturalness of the stereoscopic picture and hence undesirable.

In Fig. 5 the panels of the parallax panoramagram are parallel to the rows of dots which form the parallax panoramagram, so that the rows of dots are parallel to the lines of the viewing screen (or the cylindrical ribs, as the case may be), thus producing the moiré patterns as shown. It has been found that with the same half-tone screen moiré patterning may be minimized, and sometimes entirely avoided or reduced to a negligible amount, by printing the parallax panoramagram so that the panels thereof are at a suitable angle with respect to the rows of dots which record it, as illustrated in Fig. 6. The latter figure shows rows of dots 24 of the same spacing as in Fig. 5, and a lineating screen of the same spacing, but the rows of dots are at an angle with respect to the lineations.

There are some angles of tilt which are favorable to the elimination of moiré, and some that are unfavorable. A suitable angle can be found experimentally by laying a lineating screen over a dotted half-tone of an ordinary non-stereoscopic picture having the number of dots per inch that is to be used, and rotating the screen relative to the picture until a suitable angle between the lineations and the rows of dots is found by direct observation. Then the parallax panoramagram is printed with a half-tone screen having the same number of dots per inch and with the panels of the parallax panoramagram printed at an angle with respect to the rows of dots corresponding to that determined upon by the test. With the parallax panoramagram printed in this manner, and the lineating screen properly registered with the panels thereof, the rows of inked dots forming the contrasts and outlines of the picture will be correctly oriented with respect to the lineations of the screen so as to minimize moiré.

An ordinary non-stereoscopic picture is used in this method of determining a suitable angle by direct observation, instead of a parallax panoramagram print, in order to avoid the production of moiré patterns due to the lineations of the screen being at an angle with respect to the panels of the parallax panoramagram, or possibly due to the lineating screen not being at the proper distance from the parallax panoramagram. These last two sources of possible moiré patterning are present in ordinary photographically printed parallax panoramagrams. If a parallax panoramagram half-tone print were employed, the presence of these two additional sources of moiré patterning would confuse the observer and render difficult the elimination or minimization of the moiré due to the dots of the half-tone. This is especially true since the act of tilting the lineating screen to reduce moiré due to the half-tone elements would at the same time introduce moiré due to the lineations being at an angle with respect to the panels of the parallax panoramagram.

In general it is desirable to avoid positions where regular rows of closely spaced dots are parallel or nearly parallel to the lineations of the viewing screen, in order to avoid the possibility that the position of the rows of dots with respect to the corresponding lineations of the screen may shift slightly for successive lineations and thereby introduce a moiré which may be very pronounced. One such case is shown in Fig. 5. Generally it is best to avoid angles whose tangents are equal, or nearly equal, to the ratio of any two very small integers (considering zero as an integer). That is, it is best to avoid the following angles:

$$\text{Arc tan } 0/1 = 0°$$
$$\text{Arc tan } 1/1 = 45°$$
$$\text{Arc tan } 1/2 = 26\tfrac{1}{2}°$$
$$\text{Arc tan } 1/3 = 17°$$
$$\text{Arc tan } 2/3 = 34°$$

The angles at the top of the above list, corresponding to the smallest integers, are in general much more to be avoided than those at the bottom. Angles in the range from 45° to 90° introduce the same geometrical conditions as corresponding angles from 0° to 45°, and need not be listed.

The case in which the angle is 0° is illustrated in Fig. 5, which has already been described. The amount of moiré produced in this and in other cases depends not only upon the angle but also upon the spacing of the dots and of the lineations of the viewing screen, and upon the size of the dots.

If the rows of dots are turned to an angle of 45°, which is the arrangement most often employed in ordinary photoengraving, certain dots will still form regular rows in the direction of the vertical lines of the lineating screen. Thus each dot will be in line with a dot one row removed in one direction and one row removed in the direction at right angles. The distance between the nearest adjacent vertical rows so defined is smaller (by the factor $$\tfrac{1}{2}\sqrt{2})$$

than the distance from any dot to the dot nearest to it. The moiré produced would consequently be less likely to be serious than at the angle of 0°; but again its amount would depend upon the other conditions mentioned.

Similarly, if the angle of tilt is $$\text{arc tan } \tfrac{1}{2} = 26\tfrac{10}{2}$$

any dot will be in line vertically with a dot one row removed in one direction and two rows removed in the other direction. The distance between the nearest adjacent vertical rows so defined will be still smaller, and the chance of producing a moiré will be still less. This is particularly true when there are portions of dots of considerable size from adjacent rows of dots intervening between those at the angle of $$26\tfrac{10}{2}$$

since that will break up the regularity of the dots observed through a single lineation.

Finally, at an angle far removed from any of those particularly likely to produce moiré, especially from the angles 0° or 90°, moiré can be reduced to a negligible amount. For example, an angle of 30° satisfies these conditions, and Fig. 6 illustrates this case. It will be noticed that in Fig. 6 any row of dots parallel or nearly parallel to the lineations of the screen is broken up by the presence of large portions of dots which intervene between the dots of the selected row. This irregularity, or lack of regular vertical rows, greatly increases the possibility of avoiding moiré. A similar breaking up of regular vertical rows of dots may occur at some of the angles listed hereinbefore as being desirable to avoid, depending on the particular angle selected, the size of the dots, etc., and thus the moiré is rendered less conspicuous.

The above discussion of particular angles to be avoided has been based on the assumption that the dots of the half-tone are in rows at right angles to each other and equally spaced in the two directions, as in the usual practice. If half-tone screens having other regular arrangements of dots are employed, the above treatment of the subject can be appropriately modified to apply to such cases, keeping in mind the general considerations set forth hereinbefore.

There is another disadvantage to the ordinary half-tone reproduction which renders this type of printing somewhat undesirable even when objectionable moiré is eliminated in the manner just described. This is the lack of resolving power of an ordinary half-tone which renders the pictorial quality of the stereoscopic picture very poor. Since only a narrow portion of any lineated panel is observed from a single point of view the discontinuities in the half-tone picture are rendered much more conspicuous than in the ordinary picture. Furthermore, in order for the picture assembly to exhibit proper stereoscopic relief it is necessary for the print to record a great amount of detail, as has been pointed out hereinbefore.

Thus, an ordinary half-tone is undesirable both because it will produce moiré patterns with the lineating screen unless special precautions are taken, and also because of its inability to record sufficiently fine detail. If, however, a half-tone grating is used which has a very large number of dots per inch, for example, 400 per inch, these two disadvantages may be partially overcome. This is illustrated in Fig. 7, which shows a half-tone sufficiently fine so that each clear space of the lineating screen covers several dots of the half-tone. By this means moiré is rendered inconspicuous, although not necessarily entirely absent. If desired, the rows of dots may be tilted with respect to the lineating screen, in addition to employing the very fine half-tone screen.

It should be noted that the more perfect the lenses of the lineating screen of Fig. 2 are, the finer the detail recorded in the parallax panoramagram should be. Thus it is desirable to make the lineated strips 16' and 17' of Figs. 2 and 3 as narrow as possible so that each eye of the observer will see a picture from as nearly a single point of view as possible. But as shown in Fig. 7, the narrower the transparent spaces 21 are, the finer must be the spacing of the dots of the half-tone in order for several rows of dots to be visible through each transparent strip. Of course, diminished moiré and increased pictorial quality and depth can be obtained by using fine half-tone screens, even though several rows of dots may not be visible through each lineation. It is advisable, however, that the horizontal spacing of the dots be somewhat finer than the width of a panel visible through a single lineation from a single point of view. Also, if a print is employed of the type in which detail is shown by parallel or wavy lines of varying width, instead of by dots, these lines may be made to run at a considerable angle, preferably a right angle, with respect to the lineations of the screen, and thereby avoid moiré.

Although the difficulties due to moiré and lack of sufficient fineness of detail may be minimized in a half-tone reproduction by the use of a very fine screen and other means as described above, it is desirable to employ a photomechanically produced print of the patternless or continuous tone type, provided such a print is satisfactory in other respects. A photogelatine or collotype print on paper has been found to give very satisfactory results. This is of the continuous tone type and since there are no discrete inked elements which go to make up the picture, there is no difficulty encountered due to moiré. Furthermore, it is found that sufficiently fine detail may be reproduced in a collotype to present a very satisfactory stereoscopic picture.

Due to the fact, however, that it is difficult to get intense blacks by the collotype process the brilliancy and contrast of the observed stereoscopic picture is not all that is desirable. It is found that by applying a fairly heavy coating of a clear transparent lacquer to the black and white collotype print, the brilliancy and contrast observed in the stereoscopic picture are markedly improved. This is particularly important in stereoscopic pictures of this type in order that the difference between the views presented to each eye be sufficiently apparent to give a clear and realistic sense of depth. The lacquer is preferably applied by spraying it onto the print. Other suitable varnishes can be employed if desired.

In order to further improve the intensity of the light reflected from the picture and also to prevent the possibility of subsequent distortion of the printed picture it is advisable to adhesively secure the picture to the rear surface of the plate II. This step can be dispensed with, however, if the paper on which the print is made shows no appreciable shrinkage, etc., so that the proper registry of the picture elements with the lineating ribs is not affected. If it is not desired to secure the printed picture to the lineating screen over its entire area, it can be secured thereto at the center of the top and bottom of the picture so that any subsequent shrinkage is more or less equal on each side of the center in a horizontal direction, thereby minimizing the effects of lack of registry. If the parallax panoramagram is a print on paper, the paper may be lacquered or varnished on both sides to secure additional protection against climatic conditions, etc.

In pictures of the transmitting type it is found that colored pictures are much more effective and realistic than black and white pictures. For this reason black and white depthographs are often hand colored, preferably with oil colors. When, however, it is attempted to apply ordinary oil colors to a picture produced by the collotype process, it is found that the rubbing necessary to properly apply and blend the colors tends to smudge the ink of the collotype. Thus the picture loses much of its fine detail and is rendered unsuitable for use. It has been found possible to avoid this smudging by applying a light coating of a clear transparent lacquer, preferably by spraying, to the black and white collotype before applying the oil colors. The coating should be sufficiently heavy to prevent the smudging, but should leave a surface having enough "tooth" so that colors may be effectively and artistically applied. Sufficient tooth may be provided for by making the coating thin enough not to completely gloss over and destroy the original tooth of the paper. Also, a lacquer leaving a suitable mat surface may be used to supplement the tooth of the paper or itself provide sufficient tooth. In the latter case a heavier coating can be used, if desired, or a smoother paper employed than might otherwise be possible, thereby enhancing the fineness of detail recorded. The use of this lacquer coating also enhances the brilliancy and contrast of the completed picture, much like the effect obtained when it is applied to the plain black and white collotype. Although lacquers of the cellulose type have been found especially suitable for this purpose, suitable varnishes of other types may be used if desired.

It is also possible to apply colors mechanically to the print by the collotype process. In this case, also, it is found that the application of a fairly heavy coating of lacquer or other varnish will greatly enhance the brilliancy and contrast of the completed picture.

Fig. 8 illustrates certain of the features just described. Support plate II has an adherent coating of gelatine 12 in which cylindrical ribs 13 have been cut. On the surface of the ribs is a clear transparent coating 20' of lacquer thick enough to provide an optically smooth surface for the ribs but not so thick as to seriously impair the imaging formation of the ribs. It will be noted that the ribs are not full semi-cylindrical surfaces, but are somewhat smaller portions of a cylinder. The thickness of the lineating element and the radius of curvature of the ribs will be determined, in known manner, by the viewing angle and the number of ribs per inch. At 31 is a collotype parallax panoramagram paper print with the panels thereof in registry with the ribs 13. The collotype 31 is provided with a light coating 32 of a clear transparent lacquer over which transparent oil colors 33 of desired hue are applied by hand. The coating 32 is sufficiently thick to prevent smudging of the detail of the parallax panoramagram when the oil colors are applied, but preferably leaves a surface having enough "tooth" to permit effective application of the colors. The rear surface of the collotype is also provided with a coating 34 of lacquer to assist in preventing shrinkage of the print due to changes in climatic conditions.

It will be apparent that the present invention provides a picture assembly for exhibiting pictures in stereoscopic relief which can be much more readily and economically manufactured than those heretofore produced, and that this economy is obtained with the preservation of the quality of the observed pictures. Although the complete assembly herein described as the preferred embodiment is believed to be most advantageous, it will be apparent that many features of the preferred embodimnt may be changed, omitted, or substituted for, without departing from the spirit and scope of the invention, as pointed out in the claims. Furthermore, although the invention particularly contemplates the provision of a complete still picture assembly, certain features of the invention may also be employed for other related uses. This is particularly the case with the ribbed gelatine screen herein described, which may be useful as a lineating screen in the camera described in U. S. Patent No. 1,882,648, and also may be adapted for use as a screen for the exhibiting of projected motion pictures in stereoscopic relief.

The term "parallax panoramagram lineator", as used in the claims, will be understood to mean suitable lineating screens for use with parallax panoramagrams, as described hereinbefore. In general, when such a lineator is placed in a suitable position adjacent to a parallax panoramagram image or picture it renders visible from each point of view within a certain range only a restricted area of each panel of the parallax panoramagram image or picture.

We claim:

1. An arrangement for exhibiting a pictorial representation to be viewed in stereoscopic relief which comprises, a lenticulated lineated screen including a support element of transparent material having a transparent layer of gelatine contiguous one side thereof, said gelatine layer having a series of image-forming elements integrally formed at the surface thereof away from the supporting element, said image-forming elements having initially a mat surface and being provided with a thin transparent closely adhering film of a coating material substantially conforming to the contour of the surface of the image-forming elements to render said mat surface optically smooth without substantial impairment of the imaging formation of the image-forming elements; and a pictorial parallax panoramagram image disposed in registered cooperative relation with said lineating screen.

2. An arrangement for exhibiting a pictorial representation to be viewed in stereoscopic relief which comprises, a lenticulated lineating screen including a support element of transparent material having a transparent layer of gelatine contiguous one side thereof, said gelatine layer having a series of image-forming elements integrally formed at the surface thereof away from the supporting element, said image-forming elements having initially a mat surface and being provided with a thin transparent coating of varnish substantially conforming to the contour of the surface of the image-forming elements to render said mat surface optically smooth without substantial impairment of the imaging formation of the image-forming elements; and a pictorial parallax panoramagram image disposed in registered cooperative relation with said lineating screen substantially at the foci plane of said elements.

3. An arrangement for exhibiting a pictorial representation to be viewed in stereoscopic relief which comprises, a lenticulated lineating screen including a support element of transparent material having a transparent layer of gelatine contiguous one side thereof, said gelatine layer having a series of image-forming elements integrally formed at the surface thereof away from the supporting element, said image-forming elements having initially a mat surface and being provided with a thin transparent coating of lacquer substantially conforming to the contour of the surface of the image-forming elements to render said mat surface optically smooth without substantial impairment of the imaging formation of the image-forming elements; and a pictorial parallax panoramagram image disposed in registered cooperative relation with said lineating screen.

4. An assembly exhibiting a pictorial representation in stereoscopic relief which comprises a support plate of transparent material having an adherent transparent layer of gelatine contiguous the front side thereof, said gelatine layer having a series of image-forming lenticulations integrally formed at the surface thereof away from the supporting plate, the foci of said lenticulations being substantially at the plane of the rear side of said support plate, said lenticulations having initially a mat surface, a thin transparent coating of protective varnish covering the mat surface of said lenticulations and substantially conforming to the contour of the lenticulations, said varnish coating being of a thickness adapted to render said mat surface an optically smooth refracting surface without substantial impairment of the imaging formation of the lenticulations, and a pictorial parallax panoramagram print positioned at the rear side of said support plate and disposed in registered relation with said lenticulations at the foci plane thereof.

5. An assembly exhibiting a pictorial representation in stereoscopic relief which comprises a support plate of glass having an adherent transparent layer of gelatine contiguous the front side thereof, said gelatine layer having a series of parallel cylindrical image-forming lenticulations cut in the surface thereof away from the support plate, the foci of said lenticulations being substantially at the plane of the rear side of said support plate, said lenticulations having initially a mat surface, a thin transparent coating of lacquer covering said lenticulations and substantially conforming to the contour of the surfaces of the lenticulations to render the mat surfaces thereof optically smooth without substantial impairment of the imaging formation of the lenticulations, and a pictorial parallax panoramagram print positioned at the rear side of said support plate and disposed in registered relation with said lenticulations at the foci plane thereof.

6. A lineating screen for stereoscopic photography which comprises a support element of transparent material having a transparent layer of gelatine contiguous one side thereof, said gelatine layer having a series of image-forming elements integrally formed at the surface thereof away from the supporting element, said image-forming elements having initially mat surfaces, and a thin transparent closely adhering film of a coating material covering said image-forming elements and substantially conforming to the contour thereof to render said mat surfaces optically smooth without substantially impairing the imaging formation of said elements.

7. A lineating screen for stereoscopic photography which comprises a support element of transparent material having a transparent layer of gelatine continuous one side thereof, said gelatine layer having a series of image-forming elements integrally formed at the surface thereof away from the support element, said image-forming elements having initially mat surfaces, and a thin transparent coating of varnish covering the surfaces of said image-forming elements and substantially conforming to the contour thereof to render said mat surfaces optically smooth without substantially impairing the imaging formation of said elements.

8. A lineating screen for stereoscopic photography which comprises a glass plate support having an adherent transparent layer of solidified gelatine coating one side thereof, said gelatine layer having a series of parallel cylindrical image-forming lenticulations cut in the surface thereof away from the support plate, the cut surface of said lenticulations being initially mat, and a thin transparent coating of protective lacquer covering the mat cut surface of said lenticulations and substantially conforming to the contour of the surface of the lenticulations to provide an optically smooth refracting surface without substantial impairment of the imaging formation of the lenticulations.

9. The method of preparing a lineating screen for stereoscopic photography which comprises applying a layer of transparent gelatine to one surface of a transparent support element, forming lenticulations at that surface of the gelatine away from the said support element, the surface of said lenticulations as formed being mat, applying a coating material in liquid condition to the said lenticulated surface of the gelatine to form a thin transparent coating thereof over said surface substantially conforming to the contour of the lenticulations to thereby render said mat surface optically smooth without substantially impairing the imaging formation of said lenticulations.

10. The method of preparing a lineating screen for stereoscopic photography which comprises forming lenticulations in a layer of gelatine which is adherent to one surface of a transparent support element, the surface of said lenticulations as formed being mat, applying a thin transparent coating of varnish to the lenticulated surface of the gelatine substantially conforming to the contour of the lenticulations to thereby render said mat surface optically smooth without substantially impairing the imaging formation of said lenticulations.

11. The method of preparing a lineating screen for stereoscopic photography which comprises cutting lenticulations in a layer of gelatine which is adherent to and contiguous with one surface of a transparent support plate, the surface of said lenticulations as cut being mat, applying a thin transparent coating of protective varnish to the mat lenticulated surface of the gelatine substantially conforming to the contour of the lenticulations to thereby render said mat surface optically smooth without substantial impairment of the imaging formation of the lenticulations.

CARL PERCY.
ERNEST E. DRAPER.